No. 867,891.　　　　　　　　　　　　　　　　　PATENTED OCT. 8, 1907.
F. G. MARBACH.
BEEHIVE.
APPLICATION FILED APR. 23, 1907.

2 SHEETS—SHEET 1.

Witnesses:　　　　　　　　　　　　　　　　　Inventor:
Jas. Hutchinson　　　　　　　　　　　　　　Frank G. Marbach
J. L. Pawlov.　　　　　　　　　　　　By Prindle and Williamson
　　　　　　　　　　　　　　　　　　　　　　　　Attorneys No. 867,891. PATENTED OCT. 8, 1907.
F. G. MARBACH.
BEEHIVE.
APPLICATION FILED APR. 23, 1907.
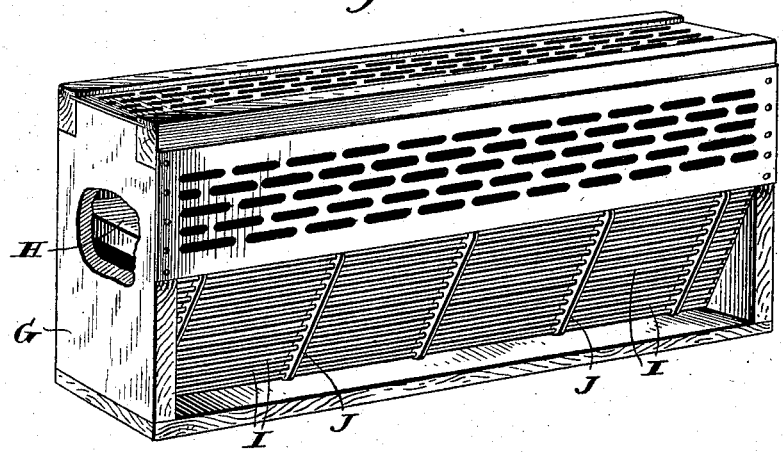
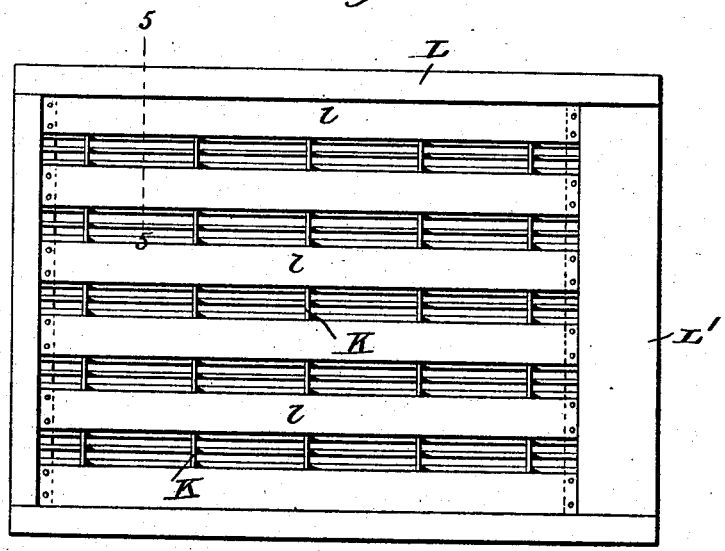
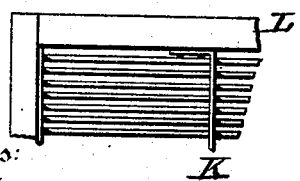
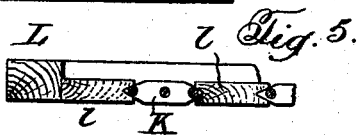
Witnesses:
Jas. E. Hutchinson
J. L. Lawlor
Inventor
Frank G. Marbach
By Prindle and Williamson
Attorneys

UNITED STATES PATENT OFFICE.

FRANK G. MARBACH, OF MEDINA, OHIO, ASSIGNOR TO THE A. I. ROOT CO., OF MEDINA, OHIO.

BEEHIVE.

No. 867,891.      Specification of Letters Patent.      Patented Oct. 8, 1907.

Application filed April 23, 1907. Serial No. 369,800.

*To all whom it may concern:*

Be it known that I, FRANK G. MARBACH, of Medina, in the county of Medina and in the State of Ohio, have invented a certain new and useful Improvement in Beehives, and do hereby declare that the following is a full, clear, and exact description thereof, reference being had to the accompanying drawings, in which—

Figure 1:
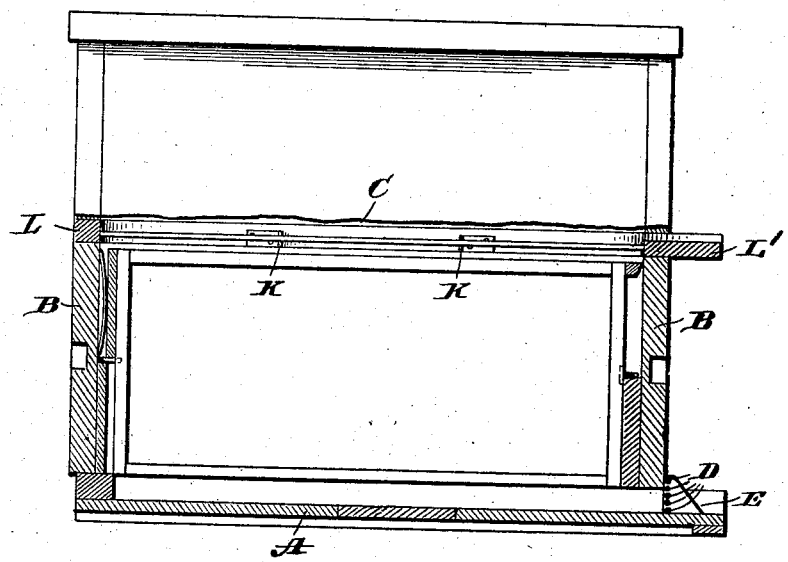
Figure 2:
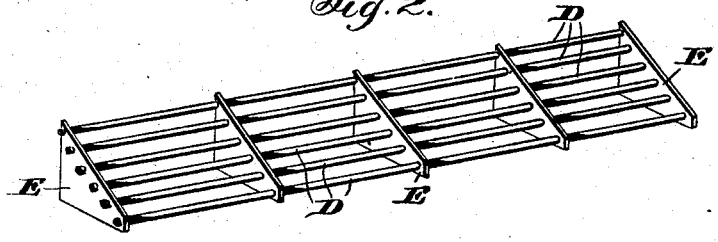

Figure 1 is a vertical section from front to rear of a hive embodying my invention; Fig. 2 a perspective view of an entrance guard constructed in accordance with my invention; Fig. 3 a like view of a queen and drone trap embodying my invention; Fig. 4 a top plan view of a queen excluder honey board containing my invention; Fig. 5 a section on line 5—5 of Fig. 4; Fig. 6 a detail plan view of another construction of queen excluder honey board that may be used.

As is well known, the worker bees are smaller than queens and drones. This difference in size has been made use of in hive construction for the separation of queens and drones and the workers, and preventing the exit of queens from the hive or their passage from the brood chamber to the surplus honey or storing chamber. For thus controlling the movements of the bees, perforated plates have been used at the points where it is desired to arrest or prevent the passage of queens and drones, having openings of such size as will permit the passage of the worker bees and prevent the passage of queens and drones, and these plates have been formed by punching holes in sheets of zinc. It has been discovered that the bur, or more or less rough edge, unavoidably incident to the punching of holes in sheet metal, injure the bees as they pass through the openings, their wings being caught by and lacerated or torn by the burs.

The object of my invention is to provide a controlling or regulating device which will be free from this very serious objection to the punched plates, and to such end my invention consists in the means for controlling or regulating the movement of bees in or from a hive, constructed substantially as hereinafter specified and claimed.

In the drawings, I show a hive of ordinary construction comprising a bottom board A, a brood chamber B resting upon the bottom board, and a surplus honey or storing chamber C above the brood chamber. At the entrance to the hive I show a guard for preventing the exit from the hive of the queen, which consists of a series of horizontal parallel rods or wires D separated by spaces just wide enough to permit the passage between a pair of adjacent rods or wires of the worker bees, said rods or wires being attached at their ends to plates E that are triangular in shape, and similar plates F being provided at intervals between the end plates to preserve the proper spacing of the bars, the rods being passed through openings in all the plates contiguous to the hypotenuse of the triangle, so that the series of wires or rods stand, when in position at the entrance of the hive, at about an angle of 45°, and either of the other two sides of the triangle serving as the bottom of the guard. The rods or wires, which preferably are round in cross section are entirely free from any burs or rough or jagged surfaces, so that there is absolutely no danger of injury to the bees in passing in contact with them, and the area of the spaces between adjacent rods or wires is much greater than is possible where the former construction, consisting of a plate of sheet metal with holes punched in it, is employed, so that, besides the important advantage of obviating injury to the bees, I secure the advantage of freer or ampler passageways for the bees.

As shown in Fig. 3, my invention is applied to a queen and drone trap of well-known construction, such trap comprising a rectangular frame G containing in its upper part a compartment H into which the queens and drones pass, their exit from the hive being obstructed by an arrangement of horizontal parallel rods or wires I extending from side to side of the frame G and from the bottom thereof to the bottom of the compartment H, the rods or wires being separated by spaces large enough to permit the passage of the worker bees, but not large enough to permit the passage of the queen and drones, and they being rigidly braced or supported at intervals intermediate their ends by plates or bars J, as in the case of the entrance guard hereinbefore described.

My invention is also applicable to honey boards placed between the brood chamber and the storage chamber, a construction for this purpose being illustrated in Figs. 1 and 4, and comprising a horizontal rectangular frame whose horizontal dimensions, of course, correspond with the like dimensions of the hive, from end to end of which is a series of horizontal parallel rods or wires spaced apart a distance sufficient to permit the passage of worker bees, and connected and braced at intervals by cross bars K. I utilize my queen excluder honey board to provide an entrance for the bees directly to the storing chamber, and for this purpose I attach to one end of the honey board a strip L' which projects beyond the hive and constitutes an alighting board for the bees to permit them to directly enter the surplus honey or storing chamber.

As shown in Fig. 4, the queen excluder honey board is composed of rods or wires in groups alternating with strips of wood *l*, while in Fig. 6 a construction is shown where rods or wires only are used.

Having thus described my invention, what I claim is:

1. As a means for controlling the movements of bees, a device comprising a series of parallel wires or rods held at fixed distances apart to permit the passage between adjacent bars or wires of worker bees only.

2. As a means for controlling the movements of bees, a device comprising a series of parallel wires or rods held at fixed distances apart to permit the passage between adjacent bars or wires of worker bees only, and parts connecting said wires or rods at points intermediate their ends.

3. As a means for controlling the movements of bees, a device comprising a series of parallel horizontal wires or rods held at fixed distances apart to permit the passage between adjacent bars or wires of worker bees only.

4. As a means for controlling the movements of bees, a device comprising a series of parallel horizontal wires or rods held at fixed distances apart to permit the passage between adjacent bars or wires of worker bees only, and parts connecting said wires or rods at points intermediate their ends.

In testimony that I claim the foregoing I have hereunto set my hand.

FRANK G. MARBACH.

Witnesses:
  N. S. KELLOGG,
  FRANK SPELLMAN.